United States Patent
Main et al.

(10) Patent No.: US 6,908,131 B2
(45) Date of Patent: Jun. 21, 2005

(54) AID FOR LIFTING AND CARRYING A MASS/OBJECT

(75) Inventors: Steven C. Main, Fort Collins, CO (US); James R. Bennett, Fort Collins, CO (US)

(73) Assignee: SM & JB Enterprises, Inc., Fort Collins, CO (US)

( * ) Notice: Subject to any disclaimer, the term of this patent is extended or adjusted under 35 U.S.C. 154(b) by 81 days.

(21) Appl. No.: 10/275,936

(22) PCT Filed: May 17, 2001

(86) PCT No.: PCT/US01/16076

§ 371 (c)(1),
(2), (4) Date: Nov. 8, 2002

(87) PCT Pub. No.: WO01/89978

PCT Pub. Date: Nov. 29, 2001

(65) Prior Publication Data

US 2004/0004367 A1 Jan. 8, 2004

Related U.S. Application Data

(60) Provisional application No. 60/205,747, filed on May 19, 2000.

(51) Int. Cl.⁷ .............................. B66C 1/12; A61G 1/01
(52) U.S. Cl. .......................... 294/150; 294/152; 5/89.1
(58) Field of Search ........................ 294/140, 149–153; 5/89.1, 625, 626–627, 628; 128/875

(56) References Cited

U.S. PATENT DOCUMENTS

| | | | |
|---|---|---|---|
| 722,456 A | * | 3/1903 | Reeves ............................ 5/627 |
| 954,840 A | * | 4/1910 | Wiedemann ................. 294/152 |
| 2,087,984 A | * | 7/1937 | McAfee et al. ................. 5/627 |
| 2,279,694 A | * | 4/1942 | Martinson ....................... 5/627 |
| 2,508,795 A | * | 5/1950 | Nielsen ....................... 294/152 |
| 2,788,530 A | * | 4/1957 | Ferguson ........................ 5/628 |
| 4,124,908 A | * | 11/1978 | Burns et al. .................... 5/627 |
| 4,431,226 A | | 2/1984 | Weilert ........................ 294/150 |
| 4,441,748 A | | 4/1984 | St. Germain .................. 294/74 |
| 4,675,925 A | * | 6/1987 | Littleton ......................... 5/607 |
| 4,737,069 A | | 4/1988 | Coblentz ..................... 414/786 |
| 4,744,115 A | * | 5/1988 | Marchione ................. 5/81.1 T |

(Continued)

*Primary Examiner*—Eileen D. Lillis
*Assistant Examiner*—Paul T. Chin
(74) *Attorney, Agent, or Firm*—Macheledt Bales & Heidmiller LLP (57) ABSTRACT

A device (10) having a flexible elongated support member (11) having an upperside, an underside, and a first and second extension (16, 18) on either side of a central-portion, each of the first and second extensions have a free-end. A first and second strap portion (26, 27) affixed to and extending from the upperside between the free-ends of the support member (11). These strap portions are employed for positioning around the mass (20). A matable first and second coupling (28A, 28B) is attached to a free end-section of each of the first and second strap portions. The strap portions (26, 27) may be adjustable in length with each respective coupling being slidably attached to its respective free end-section. Extending from the underside of the support member, and along each of the first and second extensions, is a respective first and second plurality of handles (12A, 12B, 12C, 14A, 14B, 14C) affixed to at least the underside. Also, a method of lifting to carry a mass (20) employing a device (10) comprising a flexible elongated support member (11) characterized herein. The method includes: placing the support member (11) under the mass (20) and positioning the first and second strap portion (26, 27) therearound; engaging a first and second coupling (28A, 28B) such that the mass fits snug within the strap portions; and grasping and applying a force to at least one handle from each of a first and second plurality of handles extending from, and affixed to, the underside along a respective one of the first and second extensions, to aid in the lifting.

22 Claims, 7 Drawing Sheets

U.S. PATENT DOCUMENTS

| | | | |
|---|---|---|---|
| 4,950,014 A | 8/1990 | Smith | 294/152 |
| 5,014,374 A * | 5/1991 | Williams | 5/628 |
| 5,121,514 A * | 6/1992 | Rosane | 5/628 |
| 5,368,353 A | 11/1994 | Flanders et al. | 294/152 |
| 5,388,274 A | 2/1995 | Glover et al. | 2/338 |
| 5,542,730 A | 8/1996 | Riesselmann | 294/157 |
| 5,615,426 A * | 4/1997 | Hokett | 5/89.1 |
| 5,688,011 A | 11/1997 | Gulley | 294/74 |
| 5,839,137 A * | 11/1998 | Butler et al. | 5/627 |
| 5,978,989 A | 11/1999 | Chavez | 5/627 |
| 6,065,790 A | 5/2000 | Oswald | 294/74 |
| 6,073,280 A | 6/2000 | Farnum | 5/89.1 |
| 6,193,293 B1 * | 2/2001 | Ybanez | 294/152 |
| 6,581,998 B1 * | 6/2003 | Clemens | 294/152 |

\* cited by examiner

AID FOR LIFTING AND CARRYING A MASS/OBJECT

This application claims priority under 35 U.S.C. 119(e) and 37 C.F.R. §1.78 to Provisional Patent Application U.S. No. 60/205,747 filed 19 May 2000.

BACKGROUND OF THE INVENTION

In general, the present invention relates to aids used by individuals to assist them in lifting and moving large, heavy objects (packages and other large, awkward to lift-and-carry objects without handles or hand-holds) and other masses (including sedated, injured or unconscious mammals, large fish, and so on). Although many devices have been designed and are currently in use to lift sedated, injured, or unconscious patients from the ground or other surface on which they are lying helplessly into a stationary chair, wheelchair, bed, cot or other patient transport device, operating table, etc., these known devices are bulky, heavy, and awkward to handle in-and-of themselves, and difficult if not possible to utilize in confined spaces (such as a damaged vehicle, behind furniture, in a bathtub, etc.). Here, more particularly, the invention relates to a novel, lightweight, easy to operate lifting and carrying device made of a strong webbing or fabric-type material and associated technique for aiding in lifting and carrying large objects and masses.

The ingenious device and associated technique provide medical personnel, common carriers of packages, shipping company docking crews, moving company drivers, marine biologists, construction/highway workers, carpet layers, and other individuals engaged in the lifting and/or moving of objects and masses, with a flexible, multi-use device with portable, reusable hand-holds/handles. As one will better appreciate after viewing the figures and Exhibit A, incorporated herein by reference, unlike the available large, bulky, full-body sized patient transporters (scoop cots, scoop stretchers, backboards, spine boards, netting, basket type stretchers, and the like), the handy lifting device of the invention has (1) a plurality of tiered hand-holds along the underside of each of two extensions of a flexible elongated support member, plus (2) an adjustable strap/belt having at least two strap portions, integrally as a unitary strap or individually attached to the upperside of the flexible elongated support member such that the mass contacts the upperside of the elongated support member and the strap/belt can be wrapped around the object/mass to temporarily anchor it to the flexible elongated support member while being lifted, moved, and positioned. Within the spirit and scope of the contemplated design goals, many different suitable flexible materials, temporary and permanent attachment mechanisms, suitable structure alternatives, etc., may be incorporated.

More particularly, within the medical care and biomedical research fields (human, veterinarian, marine biology, and so forth), health care and personnel and researchers frequently are called upon to lift a patient or research subject, who has fallen, been sedated, injured or otherwise incapacitated, and move the patient/subject to a destination whereby medical assistance or procedures can be administered, or where the patient/subject can safely rest, and so on. The traditional method of lifting and moving human patients, especially in an emergency situation requiring immediate assistance, is to do so without aid of one of the currently-available, bulky patient transporters (cot, stretcher, rigid backboard, netting)—as it is often quicker and in certain circumstances where space is limited, necessary (as these availble patient transporters are simply too large in size to fit). Lifting without such an aid is often referred to as the "extremity lift" and involves one person squatting down to 'bear-hug' the patient's upper body under the armpits, while at least one additional person lifts the patient's legs. This makes for unequal weight distribution between the two persons doing the lifting, as the person bearing the upper-body weight has most of the load. Further, it is awkward to put the patient down again as it involves a twisting motion of the persons doing the lifting (and he/she can be injured in the process). Additionally, the patient can slip from the arms of those performing the extremity lift. It is also difficult to perform the extremity lift when a patient is in tight quarters, such as between a bed and a wall, or between a bathtub and a toilet, in the bathtub, pinned within a damaged vehicle, and so on.

Within the emergency medical services (ambulance services, fire departments, extended-care facilities) category, the following problems are frequently encountered:

(A) Ambulance service or fire department is called upon to assist a patient who has fallen but is uninjured, to get back into a chair, wheelchair, or bed;

(B) Ambulance service or fire department needs to move a patient from the floor to a cot or stair chair in preparation for transportation to a treatment facility;

(C) In an extended-care facility, a patient needs to be lifted back into a chair, wheelchair, or bed after a fall; and so on.

Therefore, a new and useful lifting aid is needed to: prevent/minimize risk of injury to the individuals doing the lifting as well as risk of further injury to a patient/person in need of repositioning; make lifting heavy objects/masses less stressful—including lifting patients from confined spaces and awkward positions; be less difficult to position under a mass (especially an unconscious or sedated mammal) and later removed from under the mass once moved and positioned at a destination. Unlike the transporters and lifting techniques currently available, the technique of the invention employs a unique, safe and handy to operate device, as designed requiring less space to store and lighter (making it easier to carry into a rescue situation) than conventional transporters.

SUMMARY OF THE INVENTION

It is a primary object of this invention to provide an aid for lifting and carrying a mass such as a mammal or object, that includes a flexible device with a plurality of tiered handles, or hand-holds, along an underside of each of a first and second extension of a flexible elongated support member. Adjustable-length first and second strap portions of a strap/belt member (fabricated as one unitary or multiple integral, or separated, sections) are affixed to extend from an upperside of the flexible support member. These first and second strap portions are employed for positioning around the mass—to temporarily anchor the mass to the support member while being lifted and/or moved and repositioned. It is a further object to provide a technique, utilizing a lifting device of the invention, to lift, and/or move and reposition awkward, heavy masses (including mammals and objects).

The advantages of providing the new lifting aid and associated new method, as described and supported hereby, include the following:

(A) Reduce potential for further injury—The new device helps avoid injury to personnel utilizing it to lift heavy objects/masses as well as avoiding further injury to or damaging an object/mass undergoing movement, aids in making the lifting process less strenuous and more comfort patients on which it is being used.

(B) Labor cost reduction—Lifting of patients/objects can be readily accomplished with two people; and in a time when labor cost is a driving concern in every service field, overall labor costs may be reduced utilizing the device and technique of the invention.

(C) Use simplicity and versatility—Available patient transporters/cots/stretchers/backboards/netting/etc. require a great deal of patient manipulation to place the patient on the device, whereas no preliminary manipulation of the patient is required to use the device-making the lifting process more comfortable. Thus, patient movement is minimized, reducing risk of injury and making it useful in tight spaces/quarters. Additionally, several (e.g., three) of the lifting devices of the invention can be used (with the second and third under the hips and calves, allowing the lifting to be accomplished with a minimum of patient movement). The device can be used in conjunction with existing carrying boards, such as spine boards, etc. The technique of the invention, as discussed above, can be employed on a wide variety of objects/masses.

(D) Production cost reduction—The device has few components, is not brittle or bulky, is compact, and lightweight, thus saving valuable storage space on rescue units, hospital wards, research labs, trucks, and so on. Further, reducing the weight of the lifting device, reduces the total amount of weight that must lifted and moved. By way of example, a device of the invention can be rolled up to a compact six-inch by six-inch bundle and weighs just three pounds.

(E) Design simplicity—Most available patient transporters/cots/stretchers/backboards/netting/etc. are so much more awkward and complicated to use than just using the extremity lift (i.e., muscling a patient off the floor), no device is used at all. The simplicity of the device of the invention will be conducive to its repeated use; and design simplicity reduces the amount of time needed to train personnel to use it.

Briefly described, once again, the device of the invention includes: a flexible elongated support member having an upperside, an underside, and a first and second extension on either side of a central-portion, each of the first and second extensions have a free-end. A first and second strap portion are affixed to and extend from the upperside between the free-ends of the support member. These strap portions are employed for positioning around the mass. A matable first and second coupling (for example, designed for releasable-engagement thereof) is attached to a free end-section of each of the first and second strap portions. Extending from the underside of the support member and along each of the first and second extensions, is a respective first and second plurality of handles affixed to at least the underside (and can extend through the extension thickness). The strap portions may be adjustable in length with each respective coupling being slidably attached to its respective free end-section. Each of the handles are preferably affixed at a permanent location along the underside, for stability when using the device. Each of the handles can comprise a cord section (for reinforcement, added comfort for users, and strength) interposed within a length of flexible tubing.

As will be appreciated, there are numerous additional features that further distinguish this invention from known lifting apparatuses and techniques. For example, the tiered handle layout along the underside may be as follows: a first and second end of a first handle of the first plurality are each located a distance $d_{f1}$ from a central-area of the central-portion, a first and second end of a first handle of the second plurality are each located a distance $d_{r1}$ from the central-area, a first and second end of a second handle of the first plurality are each located a distance $d_{f2}$ from the central-area, a first and second end of a second handle of the second plurality are each located a distance $d_{r2}$ from the central-area, a first and second end of a third handle of the first plurality are each located a distance $d_{f3}$ from the central-area, and a first and second end of a third handle of the second plurality are each located a distance $d_{r3}$ from the central-area. In this configuration (see FIG. 4 for reference), distances $d_{f1} \approx d_{r1}$ and $d_{f2} \approx d_{r2}$, with distance $d_{f2}$ being greater than distance $d_{f1}$ and distance $d_{f3}$ being greater than distance $d_{f2}$. Also, where elongated support member has an overall length defined as $L_0$, one may choose to place the first handles of each plurality of handles such that the difference of the two quantities, $L_0/2-d_{f1}$, is greater than or equal to approximately a value $L_0/6$ to $L_0/5$.

The first and second strap portions may be integral with a center strap portion having a length, $L_{CSP}$, a periphery of the center strap portion being affixed by way of a plurality of stitches (with or without an additional fastening mechanism, such as an adhesive) through at least the upperside of the support member. Alternatively, the first and second strap portions may be affixed to the upperside in spaced relationship, for example, a spacing therebetween being generally less than or equal to the length of the central-portion of the support member. Further, defining the support member overall length as $L_0$: the first strap portion can be affixed so that it extends from a first area of the upperside located a distance at least equal to approximately a value $L_0/6$ to $L_0/5$ from the free-end of the first extension. Likewise, the second strap portion can be affixed so that it extends from a second area of the upperside located a distance at least equal to approximately a value $L_0/6$ to $L_0/5$ from the free-end of the second extension. The central-portion of the support member may include a pocket (closed at one end) or a sleeve-pocket (both ends open) adapted for receipt of an end of a stabilizing panel.

The elongated support member may be made of a flexible, pliable material such as fabric, webbing, and flat cording, allowing for the strap portions to be affixed with a plurality of stitches through at least the upperside and each handle to be, likewise, affixed with a plurality of stitches through at least the underside. To accommodate lifting and carrying of larger-sized masses, an extender-strap having a third free end-section to which a third coupling is slidably attached and a fourth free end-section to which a fourth coupling is slidably attached, can be included: the third coupling of the extender-strap being adapted for releasable-engagement with a coupling of the first strap portion and the fourth coupling being adapted for releasable-engagement with a coupling of the second strap portion. A relatively-rigid structure, such as a contoured board adapted for supporting the mass, can be employed. Such a structure preferably has a left and right aperture through which a respective one of the first and second strap portions is threaded.

The invention also includes a method of lifting to carry a mass employing a device comprising a flexible elongated support member characterized herein. The method includes: placing the support member under the mass and positioning a first and second strap portion, each affixed to and extending from the upperside between the free-ends, around the mass; engaging a first and second coupling, each of which is attached to a respective free end-section of the first and second strap portions, such that the mass fits snug within the strap portions (generally taut); and grasping and applying a force to at least one handle from each of a first and second plurality of handles extending from, and affixed to, the underside along a respective one of the first and second extensions, to aid in the lifting. With the support member made of a flexible, pliable material such as fabric, webbing, and flat cording the strap portions may be affixed by stitching.

Many of the additional novel features set forth above in connection with the device, also further distinguish the method of the invention characterized herein. For example, a mass (such a patient) is preferably carried by having a first user hold at least one handle from the first plurality, a second user hold at least one handle from the second plurality, with both users, together, repositioning the mass from an original position. Once the mass has been repositioned, the coupling may be released from engagement to remove the strap portions from the snug fit around the mass. In the event a stabilizing panel is employed, it can be handily inserted into a pocket (closed at both ends or open at both ends, as a sleeve) located within the central-portion of the flexible support member—here, the panel is placed together with the support member, under the mass. In the event an extender-strap is employed, each of its third and fourth couplings can be releasably engaged with a respective coupling of the first and second strap portions. Adjustments can be made to one or more of the first and second strap portions and/or either end of the extender-strap to accomplish a snug fit around the mass. In the event a relatively-rigid structure is employed, the mass is placed atop the structure with the support member thereunder.

BRIEF DESCRIPTION OF THE DRAWINGS AND EXHIBIT A

For purposes of illustrating the innovative nature, as well as the flexibility of design and versatility, of the preferred device and method (and alternative embodiments), the invention is hereby disclosed and more particularly described by referencing the accompanying drawings of the invention (in which like numerals in the various figures designate like parts). Each figure has been included to communicate the features of the innovative system and method of the invention by way of example, only, and are in no way intended to unduly limit the disclosure hereof.

The plan view of the underside of support member 211 of alternative device 210 in FIG. 9A, illustrates the placement of a support-loop affixed/connected to device 210 among the tiered handles along each of its extensions 16 and 18.

The plan view of the upperside of device 310 in FIG. 11A, illustrates yet another alternative placement for a support-loop pair, labeled 372 and 374, along support member 211.

Exhibit A is a copy of several photos illustrating a device (e.g., that at 10) of the invention employed as an aid to lift and carry, to reposition, a mass such as the patient shown as being lifted from a position lying on the floor to a position sitting in a chair.

DETAILED DESCRIPTION OF PREFERRED AND ALTERNATIVE EMBODIMENTS

Figures 1, 2, 3:
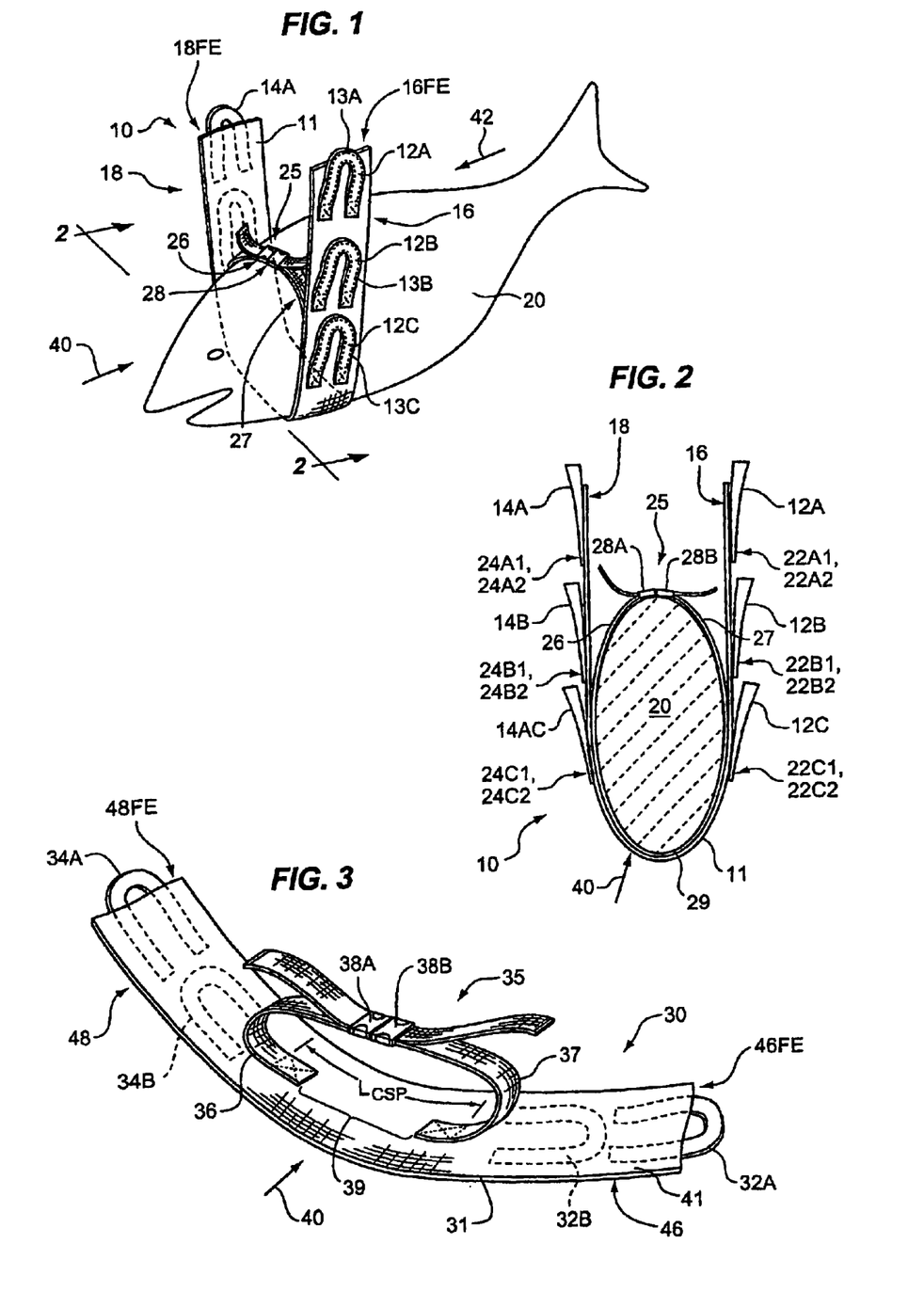
FIG. 1 is an isometric of a preferred device 10 of the invention, employed around a mass such as the identifiable fish-shape, outlined for reference only, at 20.
FIG. 2 is a sectional view of mass 20 taken along 2—2 (through, only, the mass 20) of FIG. 1 to include a side view of device 10.
FIG. 3 is an isometric of alternative device 30 of the invention, with coupling pair 38A, 38B in mating engagement such that strap portions 36, 37 are joined.

The device 10 of the invention in FIG. 1 is employed around a mass such as the identifiable fish-shape, outlined for reference only, at 20. One can appreciate the very many types of masses (from mammals to inanimate objects) on which device 10 can be used to aid in lifting and carrying. Mass 20 may be placed atop elongated support member 11, or the mass lifted and support member 11 placed under mass 20, from either of the directions labeled 40 and 42. Elongated support member 11 (see, also, details depicted in FIGS. 4 and 5) has two extensions identified and labeled 16, 18 on either side of a central-portion identified and labeled 15. At each end of extensions 16, 18 a respective free-end has been identified and labeled 16FE and 18FE for purposes of describing the features of device 10. Along extension 16, in a three-tiered hand-hold fashion, are handles 12A, 12B, 12C and along extension 18 one can see the top of handle 14A and another handle (not labeled, in phantom). Interposed within each handle at 12A, 12B, 12C is a length of cord 13A, 13B, 13C; in such a case, handles 12A, 12B, 12C, 14A, etc. can be fabricated from lengths of flexible tube stock (such as tubular webbing) and affixed, by way of suitable stitching with sturdy threading for example, to the support member. The adjustable strap/belt member 25 consists, as shown in FIG. 1, of two strap portions 26, 27 and coupling pair 28 engaged to join strap portions 26, 27. Strap portions 26, 27 can then, if desired or needed, be adjusted to create a snug fit around mass 20, thus, temporarily suitably anchoring mass 20 so it can be lifted and carried/repositioned.

In FIG. 2, one can better appreciate the flexibility in design utilizing a multi-tier structure of hand-holds, here, shown as two three-tier sets labeled 12A–12C and 14A–14C, each set located along the underside as attached to a respective extension 16, 18 of the support member 11. As can be viewed more-easily in the plan views of FIGS. 4–5, each handle 12A, 12B, 12C has a respective pair of ends 22A1–22A2, 22B1–22B2, 22C1–22C2 permanently located as shown affixed to the underside along extension 16 (the right hand side of FIG. 2). Likewise, each handle 14A, 14B, 14C has a respective pair of ends 24A1–24A2, 24B1–24B2, 24C1–24C2 permanently located as shown affixed to the underside along extension 18 (the left-hand side of FIG. 2). Adjustable strap/belt 25 has a quick-release coupling pair 28A, 28B (for example, preferably, a releasable mechanism such as a buckle, quick-release clip, VELCRO® hooks-and-loops, traditional seatbelt buckle, backpack/fanny-pack buckles, spring-release or other type of suitable releasable fastener capable of being attached to a strap member) and is shown wrapped around mass (e.g., a mammal body) to temporarily anchor it to support member 11 while mass 20 is being lifted, moved, and positioned/repositioned.

Each end of the strap/belt 25 is preferably affixed or secured by suitable means for permanent location (stitching, adhesive, thermo-forming/heat-bonding, preforming integral with the member 11, and so on) to extend from support member 11 such that an object/mass 20 positioned along the direction of arrow 40, for example, contacts strap portions 26, 27, 29 of belt/strap 25 as well as (since the belt/strap 25 has a width smaller than support member 11) the upperside of support member 11. Preferably, the belt/strap 25 can be tightened around mass 20 using couplings 28A, 28B that are slidably attached to respective free end-sections of this strap/belt 25.

FIG. 3 further illustrates the flexibility of design of the invention. The device 30 has two-tiered hand-holds: Two sets of handles are shown, one set labeled 32A–32B located along extension 46 (having a free-end identified as 46FE) and another set of handles 34A–34B located along extension 48 (having a free-end identified as 48FE). The adjustable strap/belt labeled 35, by way of further example, is shown with two strap portions 36, 37 attached to the upperside of support member 41 with a spacing 39 therebetween. Quick-release buckles labeled 38A, 38B join strap portions 36, 37. For purposes of discussion, a distance between the areas from which strap portions 36 and 37 extend from the upperside is identified and labeled $L_{CSP}$.

Figure 4:
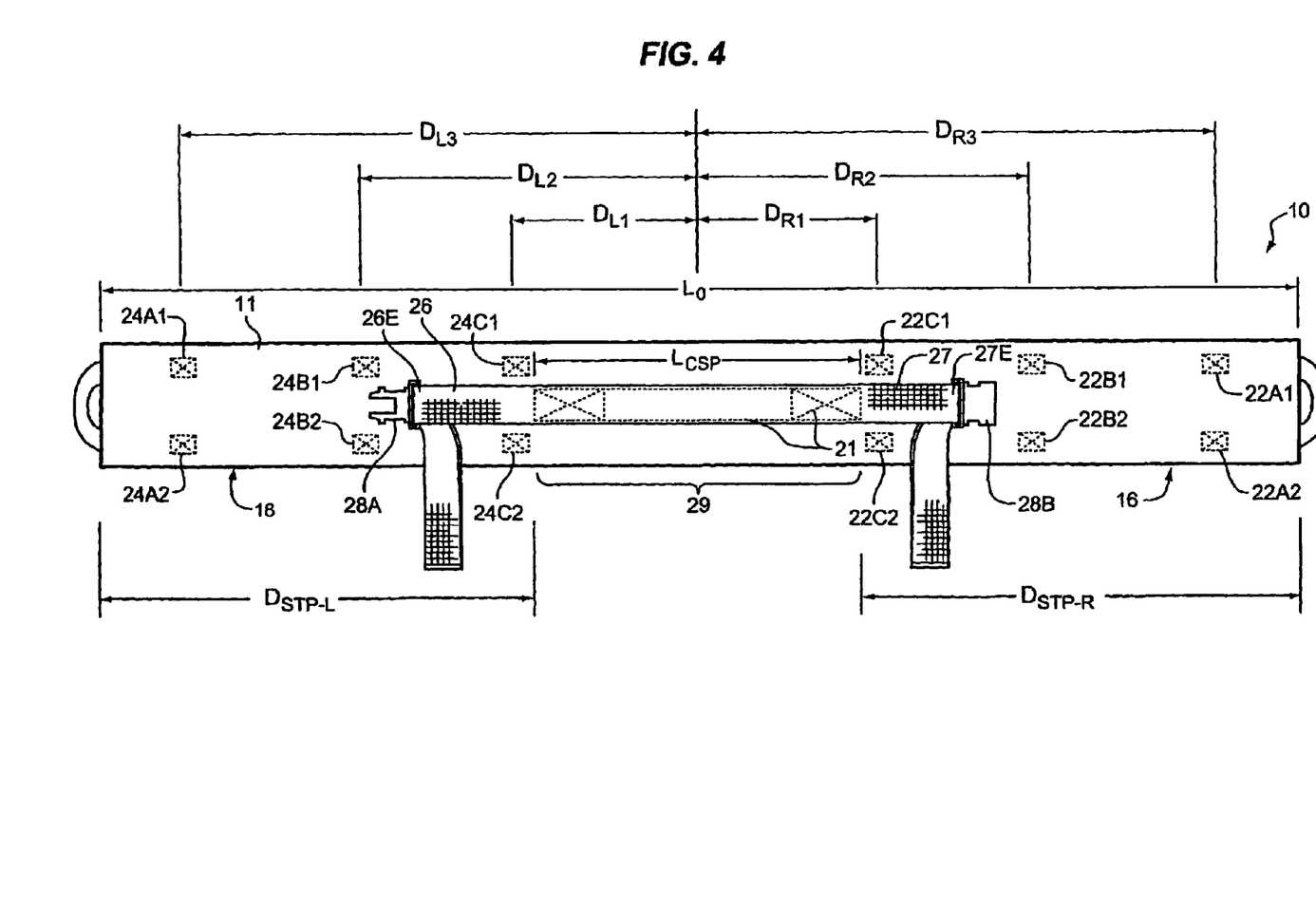
FIGS. 4 and 5 are, respectively, plan views of an upper-side and the 'flip' underside of a preferred device of the invention illustrating several novel features including the strap/belt adapted for positioning around a mass, tiered hand-hold, and stabilizing panel features.
Figure 5:
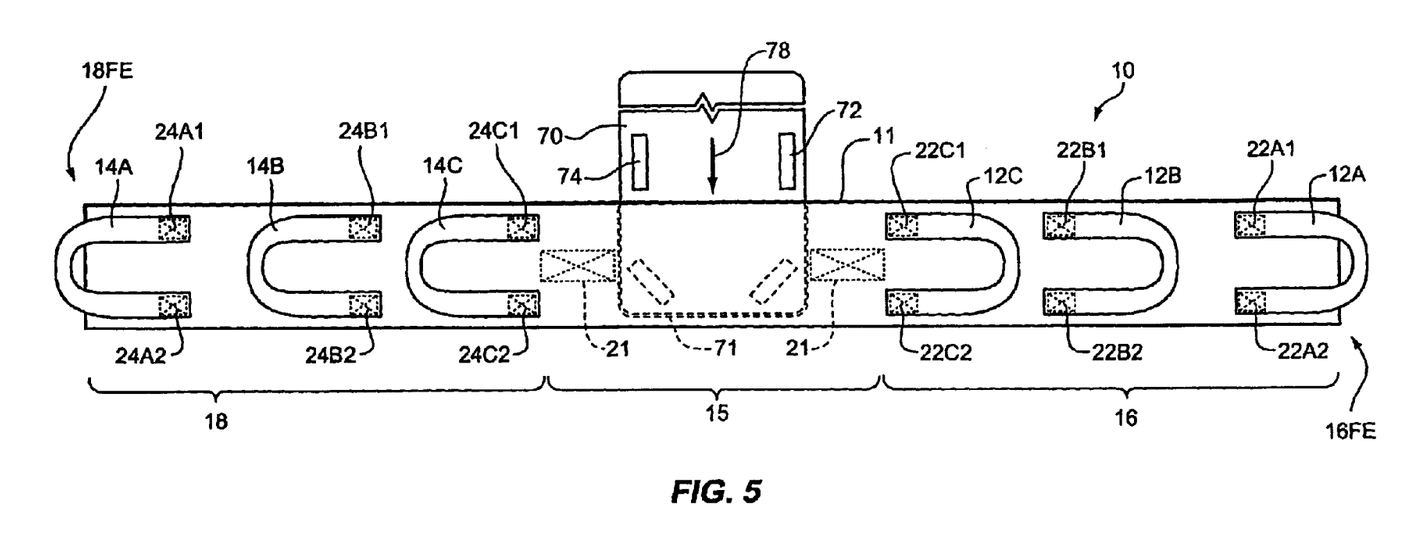

The plan views of upperside of support member 11 shown in FIG. 4 and the underside of support member 11 in FIG. 5 provide reference details to additional novel structure of the invention. Here, the support member overall length is designated as $L_0$. For example, the tiered handle layout along the underside may be as follows: the ends 24C1, 24C2 of a first handle (14C) of the first plurality are each located a distance $d_{l1}$ as referenced from a central-area of the central-portion identified in FIG. 5 at 15, the ends 22C1, 22C2 of a first handle (12C) of the second plurality are each located a distance $d_{r1}$ as referenced from the central-area, the ends 24B11, 24B2 of a second handle (14B) of the first plurality are each located a distance $d_{l2}$ as referenced from the central-area, the ends 22B1, 22B2 of a second handle (12B) of the second plurality are each located a distance $d_{r2}$ as referenced from the central-area, the ends 24A1, 24A2 of a third handle (14A) of the first plurality are each located a distance $d_{l3}$ as referenced from the central-area, and the ends 22A1, 22A2 of a third handle (12A) of the second plurality are each located a distance $d_{r3}$ as referenced from the central-area. In this configuration as referenced, one can appreciate that distances $d_{l1} \approx d_{r1}$, $d_{l2} \approx d_{r2}$, $d_{l3} \approx d_{r3}$, distance $d_{l2}$ is preferably greater than $d_{l1}$ and distance $d_{l3}$ is preferably greater than $d_{l2}$. Also, where elongated support member has an overall length defined as $L_0$, one may choose to place the first handles 14C, 12C such that the difference of the two quantities, $L_0/2 - d_{l1}$, is greater than or equal to approximately a value of one-sixth to one-fifth the overall length of the support member, or $L_0/6$ to $L_0/5$.

Turning to FIG. 4, strap portions 26, 27 each have a coupling 28A, 28B slidably attached to a respective free end-section 26E, 27E. Strap portions 26, 27 may be integral with a center strap portion 29 having a length, $L_{CSP}$, for reference. A periphery of the center strap portion 29, here, is shown affixed by way of a plurality of stitches 21 (with or without an additional fastening mechanism, such as an adhesive) through at least the upperside of support member 11. Alternatively, the strap portions may be affixed to the upperside in spaced relationship (see, once again, FIG. 3), a spacing 39 therebetween being generally less than or equal to central-portion 15. Referring to both FIGS. 4 and 5, (support member referenced length, $L_0$): each strap portion 26, 27 can be affixed so that it extends from a respective first and second area of the upperside located a distance (respectively $D_{STP-L}$, $D_{STP-R}$) at least equal to, for example, a value of one-sixth to one-fifth the overall length of the support member, or $L_0/6$ to $L_0/5$, from the free-end 18FE, 16FE of the respective extension 18, 16. The central-portion of the support member may be fabricated to include a pocket (closed at one end as shown in phantom 71) or a sleeve-pocket (open at both ends) adapted for receipt in the direction 78 of an end of stabilizing panel 70 (with or without hand-hold apertures such as those labeled 74, 72).

Figure 6:
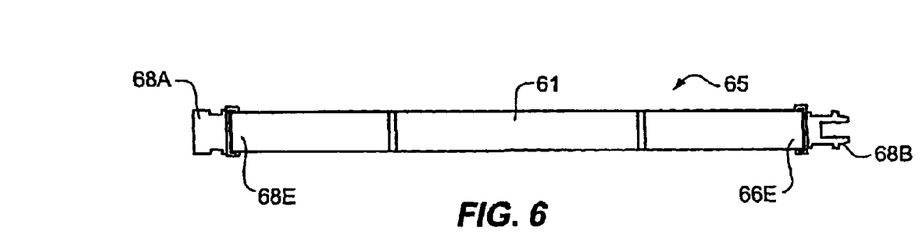
FIG. 6 is a top plan view of an extender-strap 65 feature of the invention.
Figure 8:
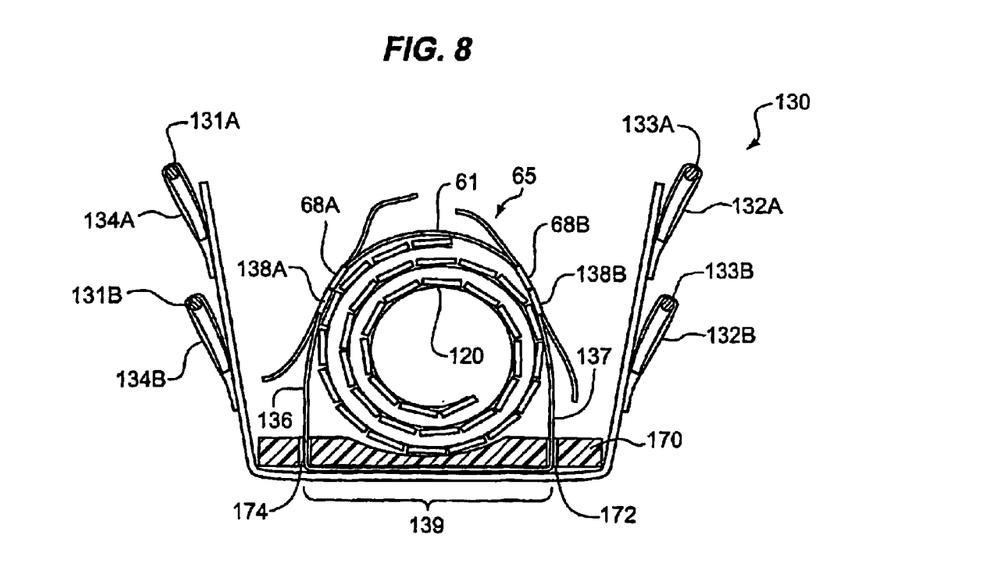
FIG. 8 is a sectional view of mass 120 (here, by way of example, a roll of fencing) atop a contoured structure 170 employed as part of device 130 to aid in lifting and carrying the mass.

As illustrated in FIG. 6 (see also FIG. 8), to accommodate lifting and carrying of larger-sized masses, an extender-strap 65 includes a belt/strap member 61 having a free end-section 68E to which coupling 68A is slidably attached and another free end-section 66E to which coupling 68B is slidably attached. The device of the invention in FIG. 8 at 130, shows coupling 68A of extender-strap 65 in releasable-engagement with coupling 138A of strap portion 136 and coupling 68B in releasable-engagement with coupling 138B of strap portion 137. A relatively-rigid structure can be employed, such as the contoured board at 170 adapted for supporting the mass 120 (such as the roll of fencing, or carpet, illustrated in FIG. 8). Such a structure preferably has a left and right aperture (174, 172—which may be hand-holds of a spine board, such as is currently in use) through which a respective strap portion 136, 137 has been threaded.

Figure 7:
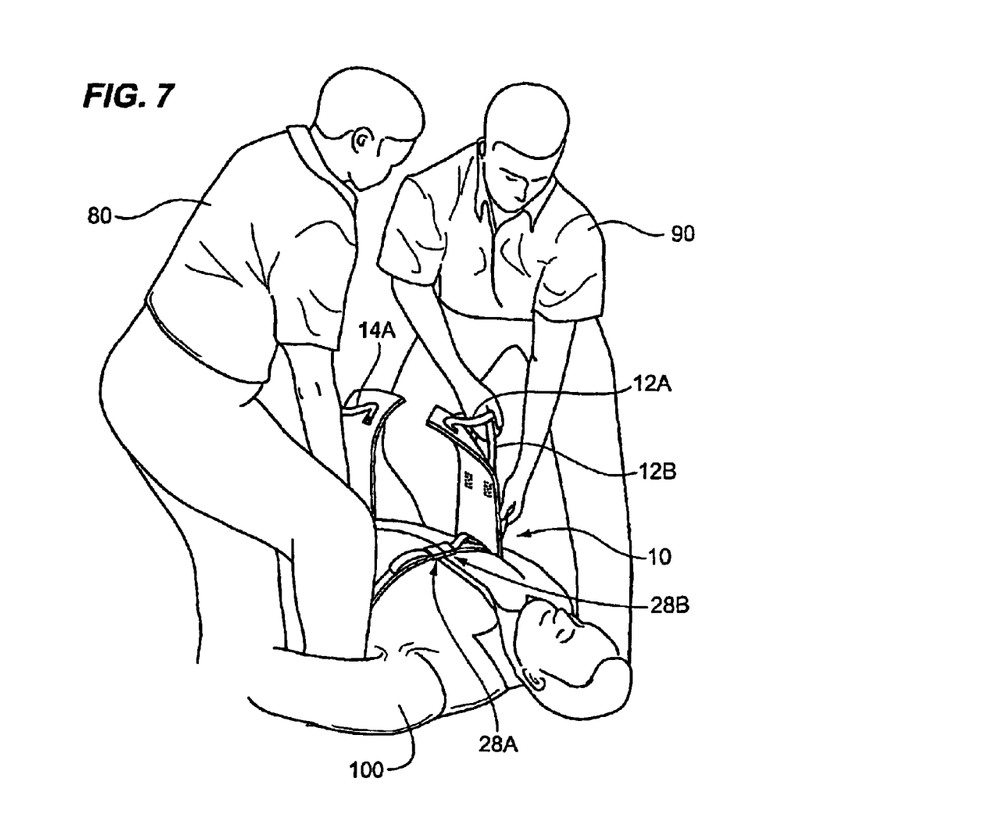
FIG. 7 depicts device 10 employed by a first and second user (each user, here, having grasped two handles in one hand) to aid in lifting mass 100 (e.g., the human outlined) from a position lying on the floor.

One can readily appreciate the advantages of the technique of the invention by way of FIG. 7 as well as attached Exhibit A, incorporated herein by reference. Here, operation of a device of the invention (such as that at 10 in other figures) in connection with a human initially lying on the ground/floor is depicted. As illustrated in FIG. 7, once the support member has been place under the mass (100) and the strap portions positioned around the mass, the couplings 28A, 28B are engaged such that the mass fits snug within the strap portions as shown. Next, a user 80 grasps handles (including hand-hold 14A) extending from the left hand extension of device 10 and user 90 grasps two handles (hand-holds 12A and 12B in one hand) as well as an unlabeled third hand-hold extending from the right hand extension of device 10. An upwardly force can be applied by the users 80, 90 to lift the mass (patient 100) for repositioning.

Exhibit A is a copy of several photo snapshots depicting the technique of the invention, whereby a device, such as that at 10 in FIGS. 1, 2, 4, 5, is in use to lift a human, by way of example only, from an original position lying on the floor to a sitting position. See also, FIG. 7. For further reference, for further detail of unique features of the invention refer to FIGS. 4–5 where device 10 is illustrated in a flat-open, unengaged position (upperside and underside plan views, respectively). The device can be operated by two people according to the following in any type of situation, by way of example only reference below is made to a 'patient' or person—but, the device can lift objects, too:

(A) Position the destination chair, wheelchair, dolly, stair chair, bed or cot near the patient/person/mammal.

(B) Unroll lifter and release 2-inch side-release buckle. Place device flat on the floor centered above patient's head with the tiered-handle side (underside) down.

(C) A rescuer on each side of the patient grasps the arms (the inside of patient's nearest elbow) and lift the shoulders just enough to slide the device under the patient's back, aligned with the patient's armpits.

(D) The extensions of the device are lifted/positioned (by way of sliding under the patient's arms/armpits) alongside and under the patient's chest-area.

(E) If the extender-strap is not needed for a larger-sized patient, join/connect the ends of the side-release buckles together and adjust the length of the two-inch webbing by pulling from the ends until snug on the patient's chest (e.g., until belt/strap is taut with little 'play'). If the patient is too large, connect the extender-strap to each buckle of the strap portions and adjust any of the extender-strap, and/or either strap portion extending from the support member.

(F) Each rescuer should select the handle appropriate to his or her height and lift using the leg muscles as much as possible.

(G) Pivot patient onto an interim or final destination/item (chair, wheelchair, or cot, or help patient to a standing position, pivot onto a bed, recliner, or other destination) alternatively, a third person can be engaged to roll the destination item under the patient.

(H) Remove the device only after the patient is securely into a chair, wheelchair, bed, or transport device.

A wide variety of flexible, pliable materials of suitable strength may be used for the elongated support member (such as those ast 11, 41), belt/strap portions, the extender-strap, and the handles (especially where a flexible tubing is used) including fabrics, webbing, and cording/cord. Using a flexible material allows for strap portions to be affixed with a plurality of stitches through at least the upperside and each handle to be affixed with a plurality of stitches through at least the underside. "Fabric" as used throughout, includes any flexible material made of an individual component or combination, or layers, of cloth, canvas (heavy, course, closely-woven fabric of, usually, natural fibers such as cotton, hemp, or flax), fibers (synthetic or natural), polymeric or other synthetic film, sheeting, or foam—whether laminated or coated—including duck-fabric; "webbing" as used throughout, includes any strong closely woven fabric or cording used for example, in seatbelts, upholstery, harnesses, climbing/hiking or packing equipment, garments, etc.; flat, rolled, or solid rope-like "cord"/"cording" as used throughout includes any twisted strands of fiber, braided strands of string/rope, a fabric/cloth with ribs. Coupling as used throughout include any device that serves to connect the ends of adjacent parts/pieces. By way of example, only, for reference a device of the invention such as that at 10 illustrated in FIGS. 4–5 (upperside and underside plan views, respectively) can be fabricated with the following components:

(A) 861 7500# N 6"—six-inch nylon webbing manufactured by the Murdock Webbing Co. Inc. of Tarboro, N.C. 27886-1197. Minimum tensile strength of 45,000 lbs.

(B) N0075-2"7K100—two-inch nylon webbing manufactured by TapeCraft Corp., Anniston, Ala. 36202. Break strength rated at 4.000 lbs.

(C) LB50RD—two-inch, double-adjustment side-release buckles, manufactured by YKK (USA), Inc., Santa Fe Spring, Calif. 90670. Not yet strength rated, however 1" buckle of same design rated at 300 lbs.

(D) N0026-1" nylon tube webbing manufactured by Tape-Craft Corp., Anniston, Ala. 36202. Break strength rated at 3,000 lbs.

(E) ⅝—inch diameter braided polyester rope, any manufacturer; and (F) UV—resistant nylon yarn thread, any manufacturer.

Two-inch nylon webbing is attached to the six-inch nylon webbing using a straight stitch on a perimeter sewing pattern. The one-inch nylon tube webbing is attached to the six-inch nylon webbing using a box X sewing pattern. A length of ⅝-inch braided polyester rope is inserted into each handle prior to attachment to make the handles more comfortable. One end of a side-release buckle is threaded onto each extending end of the two-inch webbing using a non-slip threading pattern.

While certain representative embodiments and details have been shown merely for the purpose of illustrating the invention, those skilled in the art will readily appreciate that various modifications may be made to the embodiments represented without departing from the novel teachings or scope of this invention. Accordingly, all such modifications are intended to be included within the scope of this invention as defined in the claims. Although the commonly employed preamble phrase "comprising the steps of" may be used herein, or hereafter, in a method claim, the applicants in no way intend to invoke 35 U.S.C. Section 112 ¶6. Furthermore, in any claim that is filed herewith (as well as any claim added or amended), any means-plus-function clauses used, or later found to be present, are intended to cover the structures described herein as performing the recited function and not only structural equivalents but also equivalent structures.

Figure 9A:
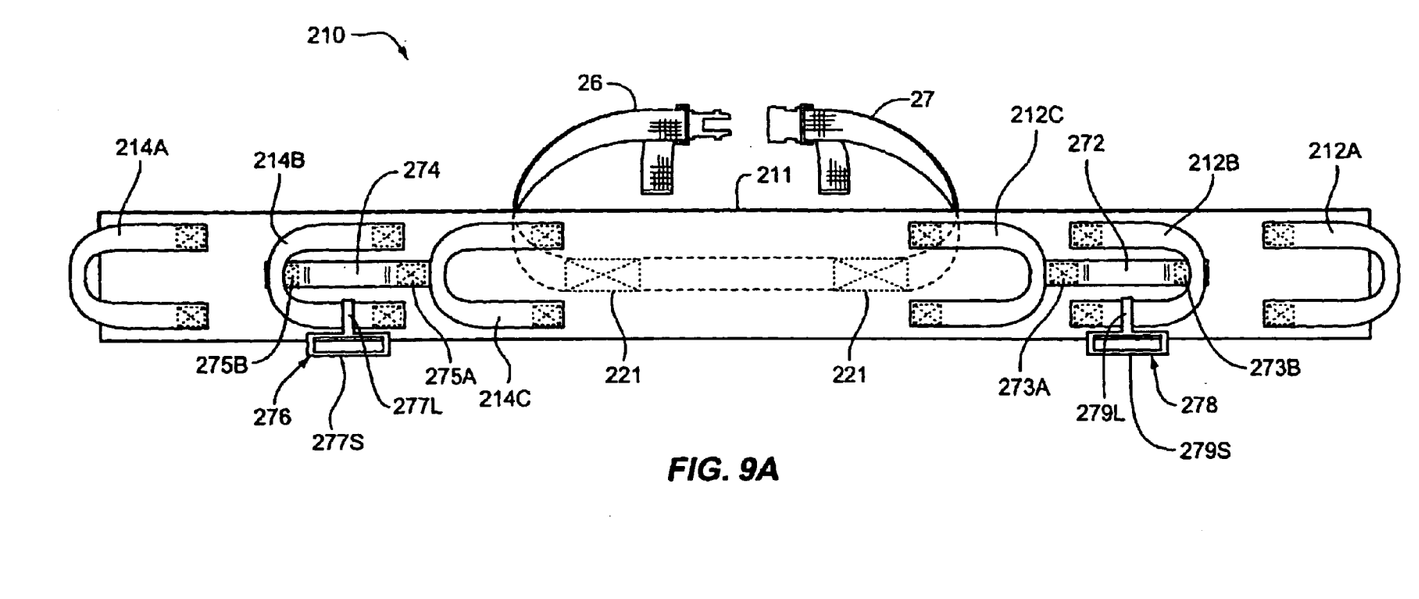

The plan view of the underside of support member 211 of the alternative device labeled 210 in FIG. 9A, illustrates the placement of a support-loop affixed/connected to device 210 among the tiered handles along each of its extensions 16 and 18 (see FIG. 5). As can be viewed in connection with FIGS. 10A–10B, each of the support-loop pairs labeled 274, 272 and 276, 278 are shaped to accept a belt/strap member (such as that labeled 61 in FIG. 6), for use to further assist in supporting a mass such as the human figure labeled 220 in FIGS. 10A and 10B. By way of illustrative example, the alternative support-loop mechanisms are shown along each extension 16 and 18 in FIG. 9A so that support-loops 274 and 276 are connected among the hand-holds 214A–214C secured along the left-hand extension; and support-loops 272 and 278 are connected among the handholds 212A–212C secured along the right-hand extension. The plan view of the upperside of device 310 in FIG. 11A, illustrates yet another alternative placement for a support-loop pair, here labeled 372 and 374, along support member 211. The support-loops operate in pairs as can be appreciated by turning also to FIGS. 10A–10B and FIG. 11B: only one support-loop need be employed along each extension to accept belt 61. In operation, as seen in FIGS. 10A–10B and 11B, belt 61 is employed as a torso/back support.

Figure 9B:
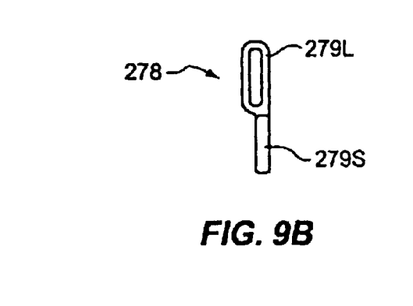
FIG. 9B is a side plan view of support-loop 278 shaped to accept a belt/strap member (such as that labeled 61 in FIG. 6).

Shown in FIG. 9A, prior to being permanently located along a respective extension of member 211, each hand-hold 214B, 212B is looped through a respective loop 277L or 279L of support-loop mechanisms 276, 278. A second looped-portion labeled 277S, 279S of support-loops 276, 278, is oriented to accept belt 61 in the manner depicted in FIG. 10B. For detail concerning support-loop mechanisms 276, 278 see the side view of mechanism 278 in FIG. 9B. Also shown in FIG. 9A are support-loop mechanisms 274, 272 affixed to member 211 at 275A, 275B and 273A, 273B respectively, by stitching and/or an adhesive, or other suitable fastening means similar to that used to affix each hand-hold/handle (e.g., 12A is affixed at 22A1, 22A2 in FIG. 5) to member 11. Support-loop straps 274, 272 are oriented so that each can accept belt 61 to support a mass 220 as depicted in FIG. 10A (a view of the back of patient 220). Here, mid-tier handles 214B, 212B are shown in phantom for simplification. Labeled for reference in phantom at 221 (FIG. 9A) is stitching employed to affix the center strap portion 29 (see FIG. 4) to member 211. Alternatively, the support-loop pair shown in phantom in FIG. 11B at 372, 374 are affixed to the upperside of support member 211 allowing belt 61 to fit snug around the torso and under the arms. Once again, it can be appreciated that support-loop mechanisms 272, 274; 276, 278; and 372, 374 are employed in pairs as illustrated in FIGS. 10A, 10B and 11B respectively to support a mass being lifted by a device of the invention.

Figure 10A:
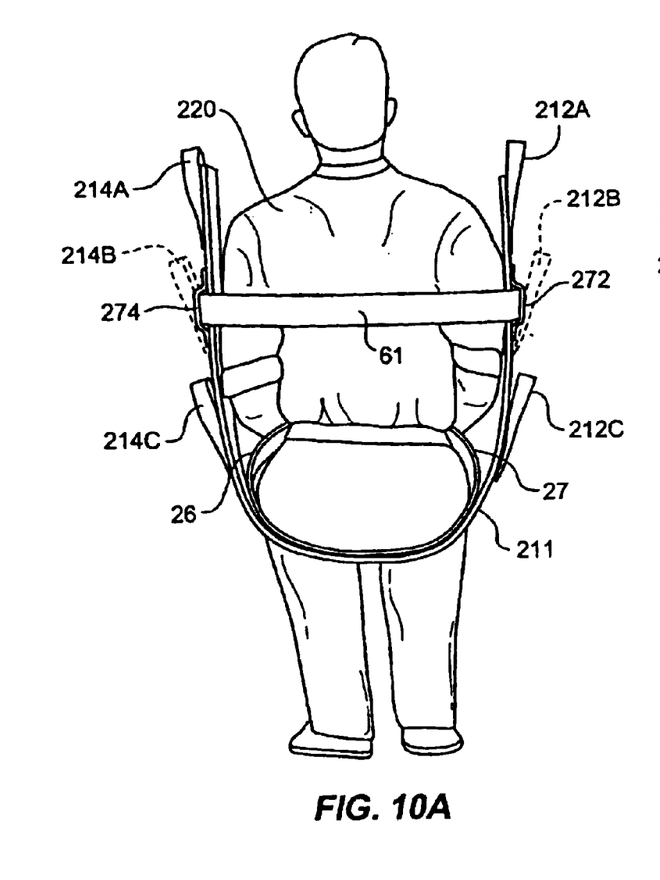
FIG. 10A is a front view, and FIG. 10B a back view, of device 210 for which strap portions 26 and 27 of belt/strap 25 have been coupled together over the lap of a patient (mass) 220, and a belt 61 placed and coupled around the middle of the patient to lend back support.
Figure 10B:
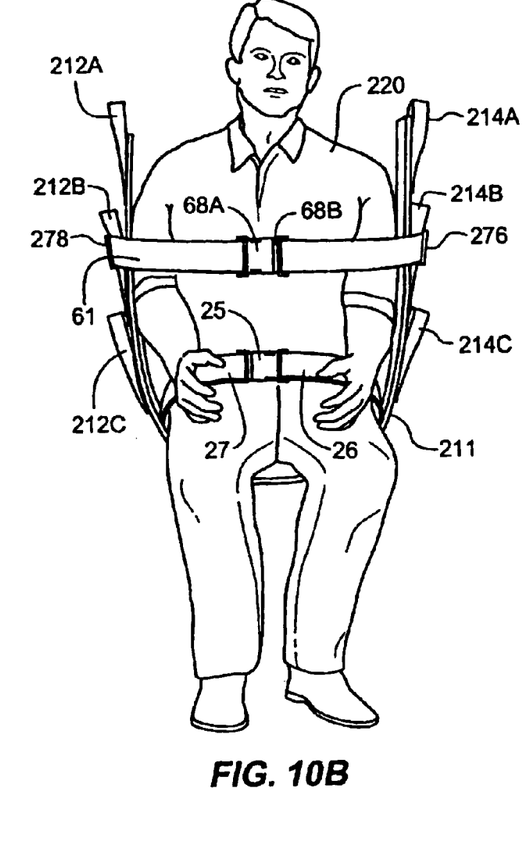
Figure 11A:
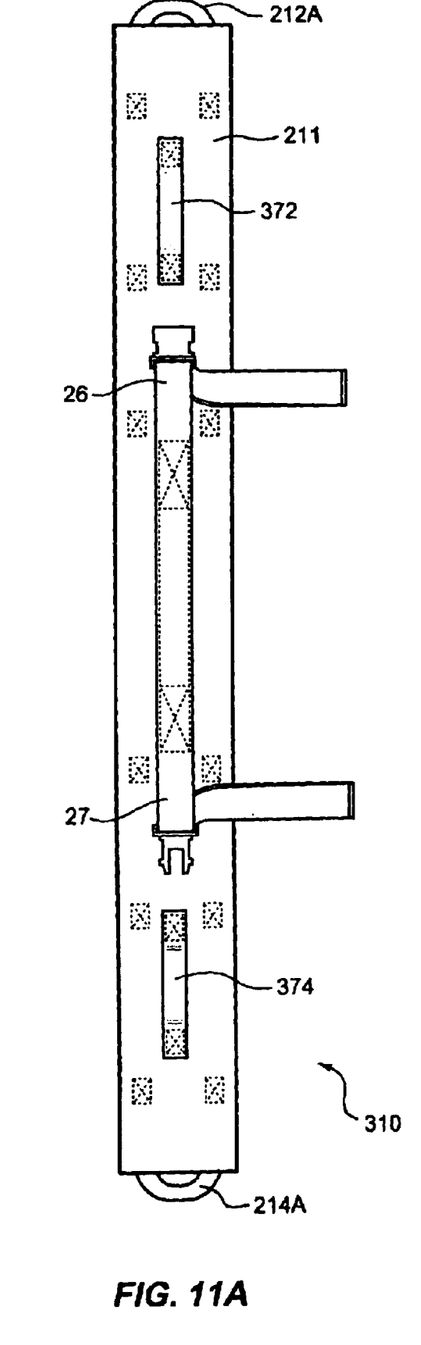
Figure 11B:
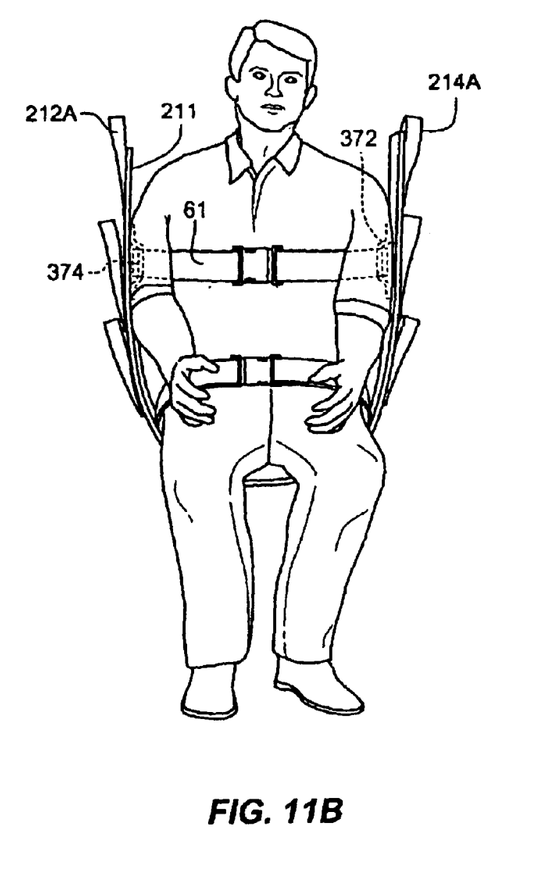
FIG. 11B is a front view of device 310 for which strap portions of belt/strap 25 have been coupled together over the lap of patient 220, and belt 61 coupled around the middle, in a manner similar to that depicted in FIG. 10B.

In each of FIGS. 10A–10B and FIG. 11B, strap portions 26 and 27 of belt/strap 25 are shown coupled together over the lap of a patient (mass) 220, by way of example, similar to the way a lap seat belt operates in a vehicle. Devices 210 and 310 operate in a manner similar to that illustrated in FIG. 7: once the support member 211 has been placed under a mass 220 and strap portions 26, 27 are positioned and coupled around the mass in a snug fit, a belt 61 may be placed and coupled around the middle of the patient as shown in FIGS. 10A–10B and FIG. 11B to lend back support. At least two users (such as the individuals identified at 80 and 90 in FIG. 7) each grasp handles extending from a respective side of device 210 or 310; then lift from the handles to aid in moving mass 220.

What is claimed is:

1. An aid for lifting and carrying a mass having an elongated shape comprising a device, the device comprising:

a flexible elongated support member having an upperside, an underside, and a first and second extension on either side of a central-portion, each of said first and second extensions having a free-end;

a first and second strap portion affixed to and extending from said upperside between said free-ends, said strap portions adapted for positioning around the mass such that, upon said positioning said strap portions are oriented orthogonally with respect to the elongated shape, a first and second coupling attached to a respective free end-section of said first and second strap portions, said first strap portion oriented to extend generally parallel lengthwise along said upperside of said first extension of said elongated support member, and said second strap portion oriented to extend generally parallel lengthwise along said upperside of said second extension of said elongated support member;

extending from said underside and along each of said first and second extensions, is a respective first and second plurality of handles affixed to said underside, an outermost handle of said first plurality of handles being affixed nearby said free-end of said first extension and an outermost handle of said second plurality of handles being affixed nearby said free-end of said second extension; and a first and second end of a first handle of said first plurality are each located a distance $d_{f1}$ along said first extension from a central-area of said central-portion, a first and second end of a first handle of said second plurality are each located a distance $d_{r1}$ along said second extension from said central-area, a first and second end of a second handle of said first plurality are each located a distance $d_{f2}$ along said first extension from said central-area, a first and second end of a second handle of said second plurality are each located a distance $d_{r2}$ along said second extension from said central-area, said distance $d_{r2}$ is greater than said distance $d_{r1}$, and said distance $d_{f2}$ is greater than said distance $d_{f1}$.

2. The device of claim 1 wherein said first and second strap portions are adjustable in length, each said first and second coupling being slidably attached to said respective free end-section, and each of said handles is affixed at a permanent location; said outermost handle of said first plurality is oriented for accepting a first force directed outwardly from said central-portion, and said handle of said second plurality is oriented for accepting a second force directed outwardly from said central-portion acting opposite said first force.

3. The device of claim 1 wherein said distances $d_{f1} \approx d_{r1}$ and $d_{f2} \approx d_{r2}$.

4. The device of claim 3:

wherein each of said handles of said first and second plurality comprises a cord section interposed within a length of flexible tubing; and further comprising a first and second end of said outermost handle of said first plurality are each located a distance $d_{f3}$ from said central-area, a first and second end of said outermost handle of said second plurality are each located a distance $d_{r3}$ from said central-area, said distance $d_{f3}$ being greater than said distance $d_{f2}$.

5. The device of claim 3 wherein: the mass is a mammal, said strap portions being positioned therearound and said first and second couplings in releasable-engagement; said elongated support member has an overall length, $L_0$; and the difference, $L_0/2 - d_{f1}$, is greater than or equal to $L_0/6$.

6. The device of claim 1 wherein: said first and second strap portions are integral with a center strap portion; a length, $L_{CSP}$, of said center strap portion is affixed to said upperside; and each one of said first and second couplings comprises a respective one of a first and second matable fastener for releasable-engagement.

7. The device of claim 6 wherein: said affixation of said center strap portion comprises a plurality of stitches through at least said upperside along a periphery of said center strap portion; said central-portion further comprising a pocket adapted for receipt of an end of a stabilizing panel; and each of said handles of said first and second plurality comprises a cord section interposed within a length of flexible tubing.

8. The device of claim 1 wherein: said first and second strap portions are affixed in spaced relationship, a spacing therebetween being generally less than or equal to said central-portion; said central-portion further comprising a sleeve-pocket adapted for receipt of a stabilizing panel; and each of said handles is affixed with a plurality of stitches through said underside and to said upperside.

9. The device of claim 1 wherein said flexible elongated support member is made of a material selected from the group consisting of fabric, webbing, and flat cording; and said first and second strap portions are affixed with a plurality of stitches through at least said upperside; and each of said handles is affixed with a plurality of stitches through at least said underside.

10. The device of claim 9 wherein: said elongated support member has an overall length, $L_0$; said first strap portion extends from a first area of said upperside located a distance at least equal to $L_0/5$ from said free-end of said first extension, said second strap portion extends from a second area of said upperside located a distance at least equal to $L_0/5$ from said free-end of said second extension; said plurality of stitches affixing each of said handles to extend though an adhesive applied to said underside.

11. The device of claim 10 wherein the mass is an object; and further comprising an extender-strap having a third free end-section to which a third coupling is slidably attached and a fourth free end-section to which a fourth coupling is slidably attached, said third coupling adapted for releasable-engagement with said first coupling of said first strap portion and said fourth coupling adapted for releasable-engagement with said second coupling of said second strap portion.

12. The device of claim 1 wherein: said elongated support member has an overall length, $L_0$, said first strap portion extends from a first area of said upperside located a distance at least equal to $L_0/6$ from said free-end of said first extension, and each of said first and second plurality of handles comprises said first and said outermost handle, which is said second handle; and further comprising a relatively-rigid structure, a left and right aperture through which a respective one of said first and second strap portions is threaded.

13. The device of claim 12 wherein: said flexible elongated support member is made of a material selected from the group consisting of fabric, webbing, and flat cording; said first and second strap portions are each made of a material selected from the group consisting of strengthened fabric, webbing, and flat cording; each of said handles comprises a length of flexible tubing made of a material selected from the group consisting of reinforced-fabric, webbing, and cording; and said relatively-rigid structure comprises a contoured board adapted for supporting the mass.

14. A method of lifting to carry a mass having an elongated shape employing a device comprising a flexible elongated support member having an upperside, an underside, and a first and second extension on either side of a central-portion, each of the first and second extensions having a free-end, the method comprising the steps of:

placing the support member under the mass such that the support member is oriented orthogonally with respect to a lengthwise direction of the elongated shape and positioning a first and second strap portion, each affixed to and extending from the upperside between the free-ends, around the mass such that said strap portions are also oriented orthogonally with respect to said lengthwise direction;

engaging a first and second coupling, each of which is attached to a respective free end-section of said first and second strap portions, such that the mass fits snug within said strap portions, leaving initially unconstrained, each of the free-ends of the first and second extension of the elongated support member; and grasping and applying a force directed outwardly from said central-portion in each of a first and second direction acting oppositely along the elongated support member, to at least one handle from each of a first and second plurality of handles extending from, and affixed to, the underside along a respective one of the first and second extensions, to aid in the lifting; and prior to said placing the support member:

affixing a first and second end of a first handle of said first plurality by stitching to the underside a distance $d_{l1}$ from a central-area of said central-portion, affixing a first and second end of a first handle of said second plurality by stitching to the underside a distance $d_{r1}$ from said central-area; and affixing a first and second end of a second handle of said first plurality by stitching to the underside a distance $d_{l2}$ from said central-area, affixing a first and second end of a second handle of said second plurality by stitching to the underside a distance $d_{r3}$ from said central-area; said distance $d_{r2}$ being greater than said distance $d_{r1}$, and said distance $d_{l2}$ being greater than $d_{l1}$.

15. The method of claim 14 wherein the elongated support member has an overall length, $L_0$ and is made of a material selected from the group consisting of fabric, webbing, and flat cording; and further comprising, prior to said step of placing the support member under the mass, the steps of:

affixing said first strap portion by stitching such that a first stitched area of the upperside extends therefrom a distance at least equal to $L_0/6$ from the free-end of the first extension; and affixing said second strap portion by stitching such that a second stitched area of the upperside extends therefrom a distance at least equal to $L_0/6$ from the free-end of the second extension.

16. The method of claim 15 further comprising, after said grasping, the steps:

carrying the mass by: a first user holding at least one handle from said first plurality, a second user holding at least one handle from said second plurality, and both said first and second users, together, repositioning the mass from an original position to a reposition; and once said repositioning is performed, releasing an engagement of said first and second couplings to remove said first and second strap portions from said snug fit around the mass.

17. The method of claim 14 further comprising, prior to said step of placing the support member under the mass, the step of inserting and locating an end of a stabilizing panel into a pocket located within the central-portion; and wherein said step of placing the support member under the mass further comprises placing the panel together with the support member under the mass.

18. The method of claim 14 wherein said step of engaging a first and second coupling further comprises the steps of: engaging said first coupling of said first strap portion with a third coupling attached to a third free end-section of an extender-strap, engaging said second coupling of said second strap portion with a fourth free end-section of said extender-strap, and adjusting at least said first strap portion's length for said snug fit around the mass.

19. The method of claim 14 wherein:
said distances $d_{l1} \approx d_{r1}$; and
said distances $d_{l2} \approx d_{r2}$.

20. The method of claim 19 further comprising, prior to said step of placing the support member, the steps of affixing a first and second end of an outermost handle of said first plurality by stitching, and affixing a first and second end of an outermost handle of said second plurality by stitching, both said outermost handles so stitched closer and nearby to a respective one of the free-ends of the first and second extensions, than said second handles.

21. The method of claim 19 further comprising, prior to said steps of affixing a first and second end of a first handle of each of said first and second plurality, the step of producing each of said first handles by interposing a cord section within a length of flexible tubing; and wherein said step of grasping and applying a force further comprises a first user grasping, together, said first and second handle of said first plurality, and a second user grasping, together, said first and second handle of said second plurality.

22. The method of claim 14 further comprising, prior to said step of placing the support member under the mass, the steps of threading said first strap portion through a left aperture of a relatively-rigid structure and threading said second strap portion through a right aperture of said structure; and wherein said step of placing the support member under the mass further comprises placing the mass atop said structure with the support member thereunder.

* * * * *